(12) United States Patent
Nguyen

(10) Patent No.: US 9,918,325 B2
(45) Date of Patent: Mar. 13, 2018

(54) ENHANCED INTER-CELL INTERFERENCE COORDINATION

(71) Applicant: Si Nguyen, Winchester, MA (US)

(72) Inventor: Si Nguyen, Winchester, MA (US)

(73) Assignee: AltioStar Networks, Inc., Tewksbury, MA (US)

(*) Notice: Subject to any disclaimer, the term of this patent is extended or adjusted under 35 U.S.C. 154(b) by 0 days.

(21) Appl. No.: 14/717,480

(22) Filed: May 20, 2015

(65) Prior Publication Data

US 2015/0341941 A1 Nov. 26, 2015

Related U.S. Application Data

(60) Provisional application No. 62/001,529, filed on May 21, 2014.

(51) Int. Cl.

| | |
|---|---|
| *H04W 72/08* | (2009.01) |
| *H04W 72/04* | (2009.01) |
| *H04W 24/02* | (2009.01) |
| *H04W 36/00* | (2009.01) |
| H04W 16/32 | (2009.01) |
| H04W 36/22 | (2009.01) |

(52) U.S. Cl.
CPC ........ *H04W 72/082* (2013.01); *H04W 24/02* (2013.01); *H04W 36/0011* (2013.01); *H04W 36/0083* (2013.01); *H04W 72/0426* (2013.01); *H04W 72/0446* (2013.01); *H04W 16/32* (2013.01); *H04W 36/22* (2013.01); *H04W 72/0486* (2013.01)

(58) Field of Classification Search
CPC ........... H04W 72/082; H04W 72/0446; H04W 72/0486; H04W 72/0426; H04W 24/02; H04W 16/32; H04W 36/0011; H04W 36/0083; H04W 36/22
See application file for complete search history.

(56) References Cited

U.S. PATENT DOCUMENTS

| | | | |
|---|---|---|---|
| 2013/0044704 A1 | 2/2013 | Pang et al. | |
| 2013/0250764 A1 | 9/2013 | Vasudevan et al. | |
| 2014/0126403 A1* | 5/2014 | Siomina | H04W 24/10 370/252 |
| 2015/0119053 A1* | 4/2015 | Morimoto | H04W 16/08 455/450 |
| 2015/0148050 A1* | 5/2015 | Siomina | H04J 11/005 455/452.1 |

(Continued)

FOREIGN PATENT DOCUMENTS

| | | |
|---|---|---|
| EP | 2717606 A1 | 4/2014 |
| WO | WO-2013063604 A2 | 5/2013 |

OTHER PUBLICATIONS

International Search Report and Written Opinion for Application No. PCT/US2015/031776.

*Primary Examiner* — Jianye Wu
(74) *Attorney, Agent, or Firm* — Mintz Levin Cohn Ferris Glovsky and Popeo, P.C.

(57) ABSTRACT

A system, a method, and a computer program product for providing an enhanced inter-cell interference coordination. Information indicating at least one almost blanking subframe (ABS) being allocated is being exchanged by at least two cells in a wireless network. Based on the allocated ABS, the devices further exchange information indicating a wireless signal throughput.

54 Claims, 17 Drawing Sheets

(56) References Cited

U.S. PATENT DOCUMENTS

2015/0249530 A1\* 9/2015 Zhang .................. H04L 5/0058
370/329
2016/0057642 A1\* 2/2016 Zhang .................. H04W 24/00
370/252

\* cited by examiner

FIG. 10.

| ABS Allocation (# subframes out of 10) | Target Average User Throughput On Micro Cell |
|---|---|
| 1 | .8 mbps |
| 2 | .7 mbps |
| .. | .. |
| 8 | .2 mbps |

1000

ENHANCED INTER-CELL INTERFERENCE COORDINATION

CROSS-REFERENCE TO RELATED APPLICATIONS

The present application claims priority to U.S. Provisional Patent Application No. 62/001,529 to Nguyen, filed May 21, 2014, and entitled "Enhanced Inter-Cell Interference Coordination," and incorporates its disclosure herein by reference in its entirety.

TECHNICAL FIELD

The subject matter described herein generally relates to data processing and in particular, to an enhanced inter-cell interference coordination in a long term evolution radio access network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications between users in existing digital cellular networks are typically defined and/or affected by various factors and/or parameters. Some of these parameters include interference that can affect network throughput, quality of wireless signal, efficiency of the network, and/or other parameters. Interference can be caused by various wireless cells operating in the same geographical location. A signal originating from one cell (e.g., a macro cell) can be more powerful than a signal originating from another cell (e.g., a micro cell, a pico cell, a femto cell, etc.), which can cause a substantial amount of interference between these signals. Thus, there is need to provide an efficient and a cost-effective solution to existing LTE systems that is capable of reducing interference as well as providing efficient wireless network communications.

SUMMARY

In some implementations, the current subject matter relates to a method for providing an enhanced inter-cell interference coordination. The method can be performed by a micro cell and/or any other base station. The method can include receiving information indicating at least one almost blanking subframe ("ABS") being allocated, and transmitting, based on the allocated ABS, information indicating a wireless signal throughput.

In some implementations, the current subject matter can include one or more of the following optional features. An evolved node (eNodeB) base station having a processor and a memory can be configured to perform the receiving and the transmitting. In some implementations, the traffic throughput information can be determined based on a time of day during which at least one wireless signal is being processed by the processor. The processor can use a self-optimizing function to optimize the wireless signal throughput information. The wireless signal throughput information can include at least one of the following: a number of user equipments communicating with the eNodeB, a resource utilization at the eNodeB, a target user equipment throughput information, and a target proportional fair metric. The processor can transmit cell range expansion information. The eNodeB can be a micro cell communicating with at least one macro cell. In some implementations, the micro cell can transmit an indication of utilization of ABS subframes to the macro cell. For example, an indication that the ABS subframes are fully utilized can correspond to the micro cell being fully utilized and being unable to accept handover of additional user equipment from the macro cell. An indication that the ABS subframes are not fully utilized can correspond to the micro cell being not fully utilized and being able to accept handover of additional user equipment from the macro cell. In some implementations, the macro cell, based on the indication of ABS subframes utilization, can determine whether to modify ABS subframe allocation. Modification of ABS subframe allocation can include at least one of the following: increasing a number of ABS subframes allocated, decreasing the number of ABS subframes allocated, and unchanging the number of ABS subframes allocated.

In some implementations, the current subject matter relates to a method for providing an enhanced inter-cell interference coordination. The method can be performed by a macro cell and/or any other base station. The method can include transmitting information indicating at least one almost blanking subframe (ABS) being allocated, and receiving, based on the allocated ABS, information indicating a wireless signal throughput.

In some implementations, the current subject matter can include one or more of the following optional features. In some implementations, an evolved node (eNodeB) base station having a processor and a memory can perform the transmitting and the receiving. The traffic throughput information can be determined based on a time of day during which at least one wireless signal is being processed by the at least one processor. The wireless signal throughput information can be optimized using a self-optimizing network function. The wireless signal throughput information can include at least one of the following: a number of user equipments communicating with the eNodeB, a resource utilization at the eNodeB, a target user equipment throughput information, and a target proportional fair metric. The processor can receive cell range expansion information. Based on the received cell range expansion information, the macro cell can determine at least one of the following: additional number of user equipments for handover to the micro cell, a handover parameter, additional bandwidth to be allocated for use by the user equipments communicating with the eNodeB, and a remaining bandwidth of the macro cell. The eNodeB can be a macro cell communicating with at least one micro cell. In some implementations, the macro cell can receive an indication of utilization of ABS subframes from the micro cell. An indication that the ABS subframes are fully utilized can correspond to the micro cell being fully utilized and being unable to accept handover of additional user equipment from the macro cell. An indication that the ABS subframes are not fully utilized can correspond to the micro cell being not fully utilized and being able to accept handover of additional user equipment from the macro cell. In some implementations, the macro cell, based on the indication of ABS subframes utilization, can determine whether to modify ABS subframe allocation. Modification of ABS subframe allocation can include at least one of the following: increasing a number of ABS subframes allocated, decreasing the number of ABS subframes allocated, and unchanging the number of ABS subframes allocated.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 10 illustrates an exemplary table containing target average user throughput on a micro cell in view of the allocated number of almost blanking subframes, according to some implementations of the current subject matter;

DETAILED DESCRIPTION

To address the deficiencies of currently available solutions, one or more implementations of the current subject matter provide an enhanced inter-cell interference coordination in a long term evolution radio access network having an intelligent capability.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
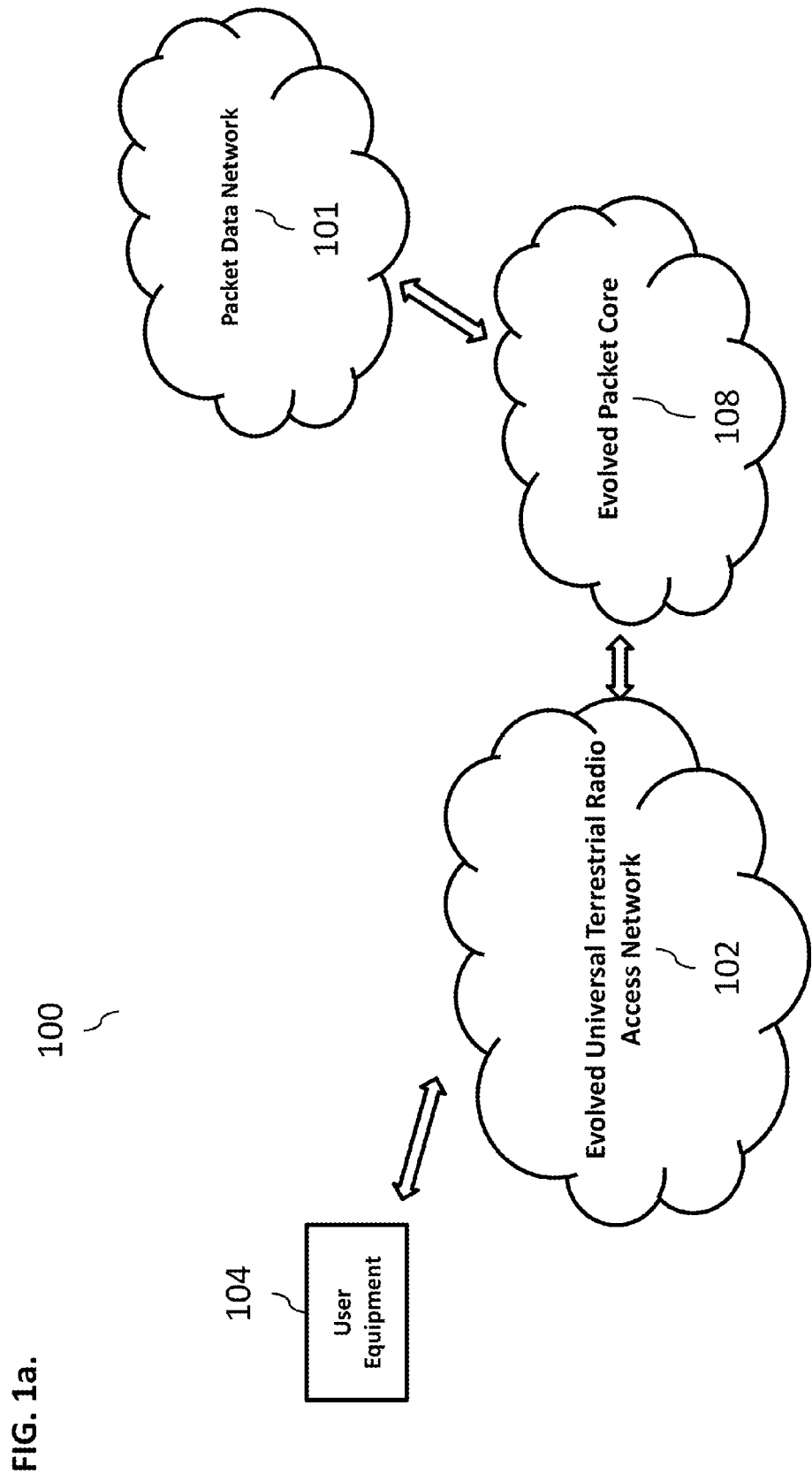
FIG. 1a illustrates an exemplary conventional long term evolution ("LTE") communications system.
Figure 1B:
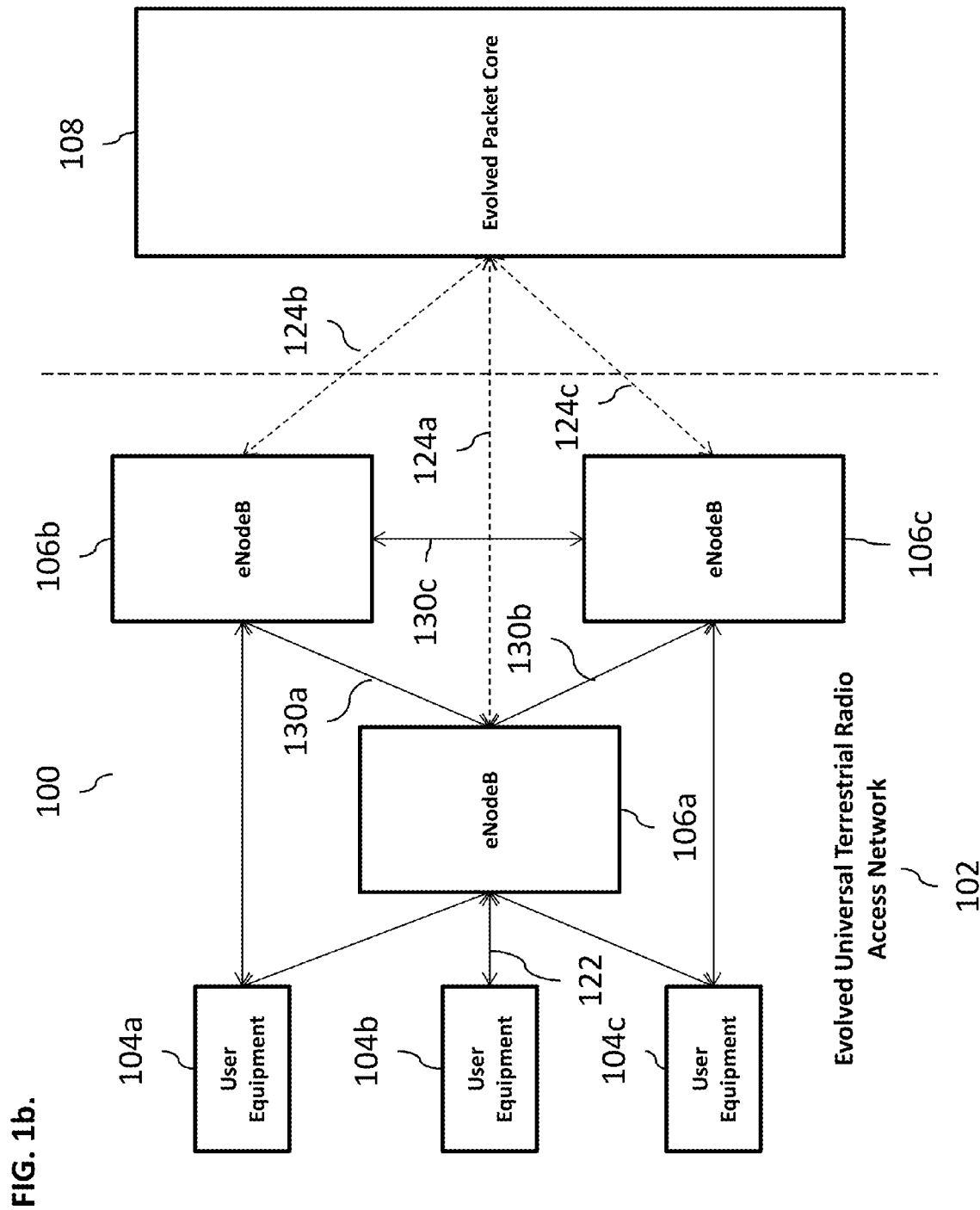

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
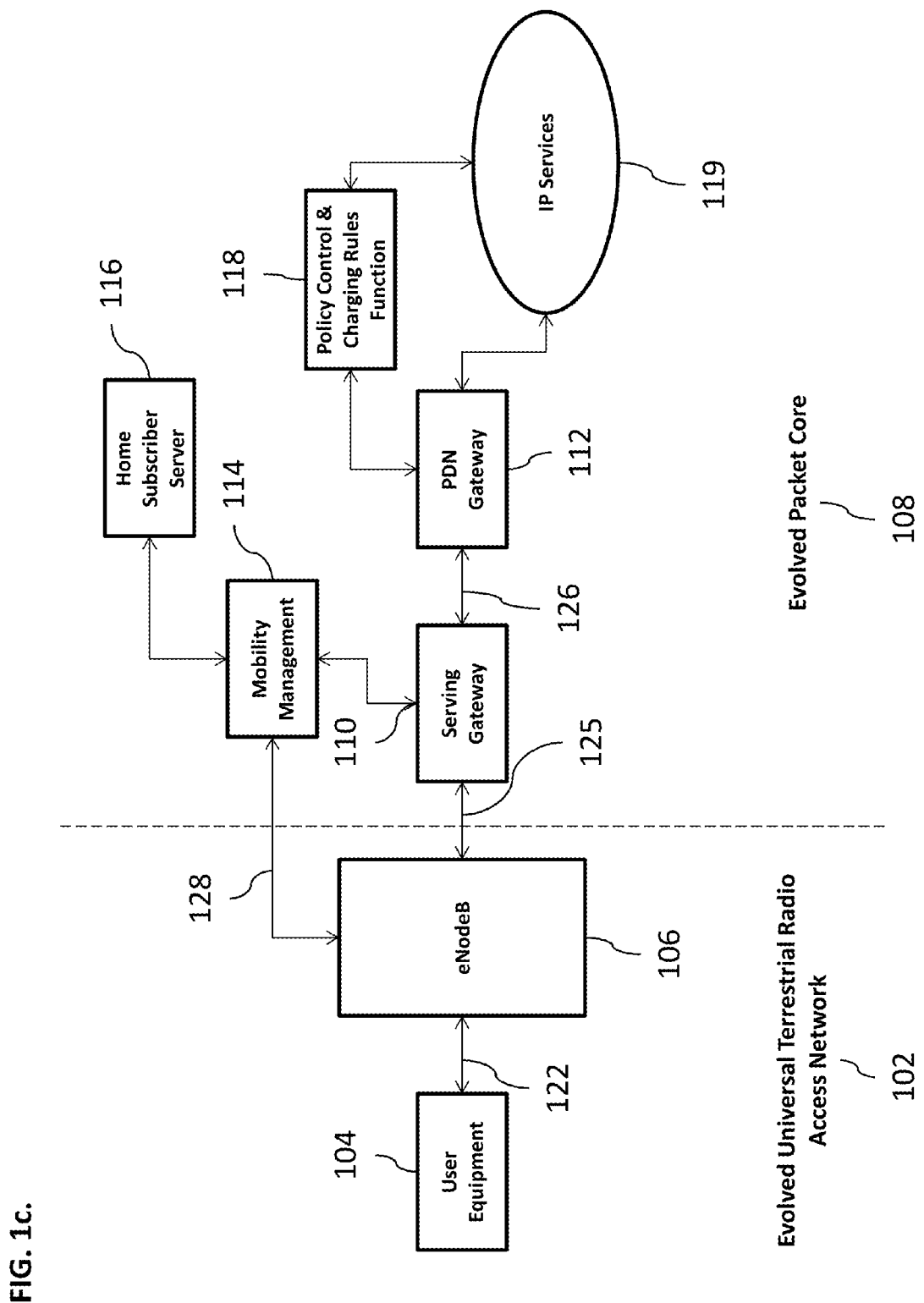

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
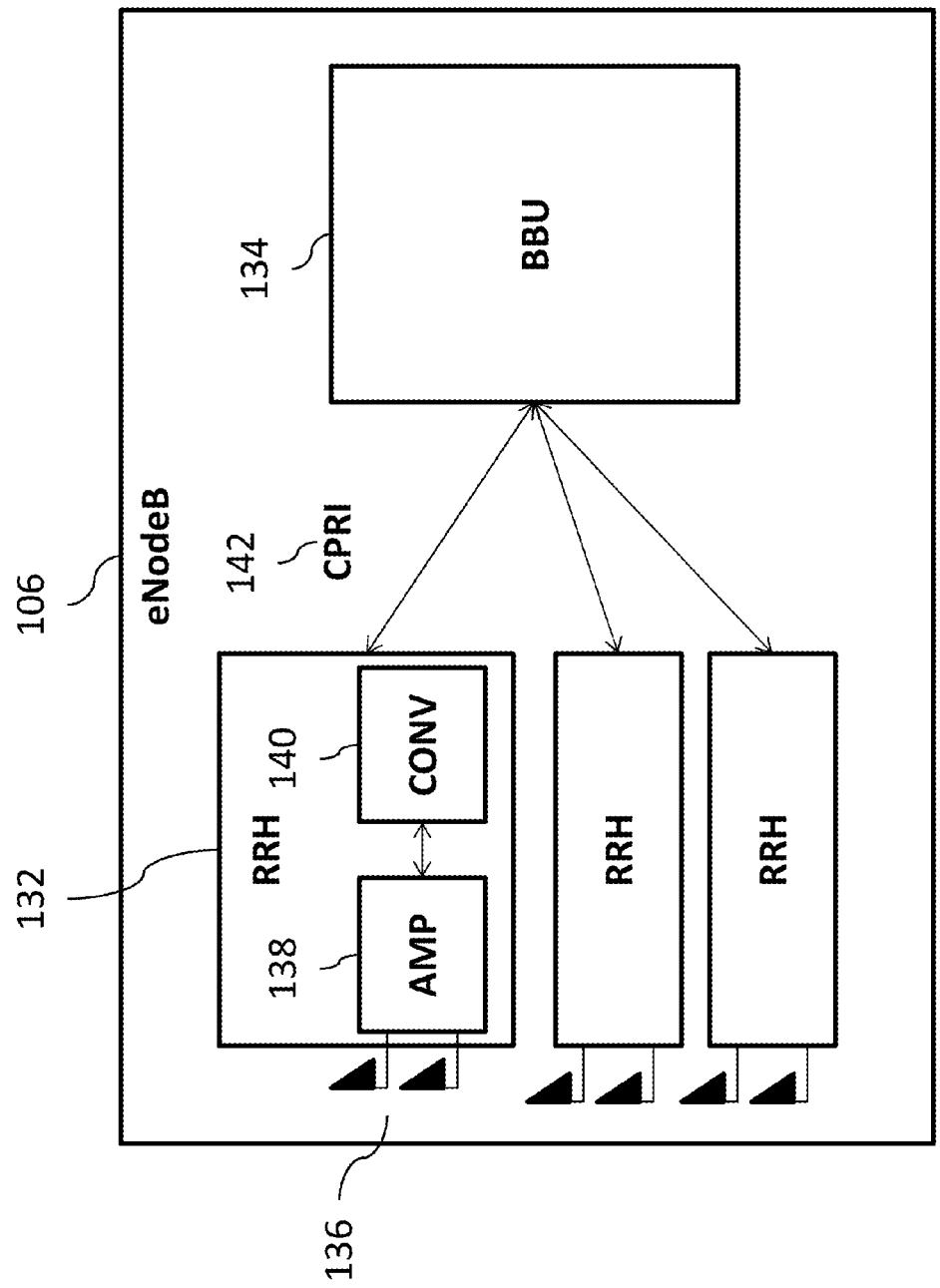

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
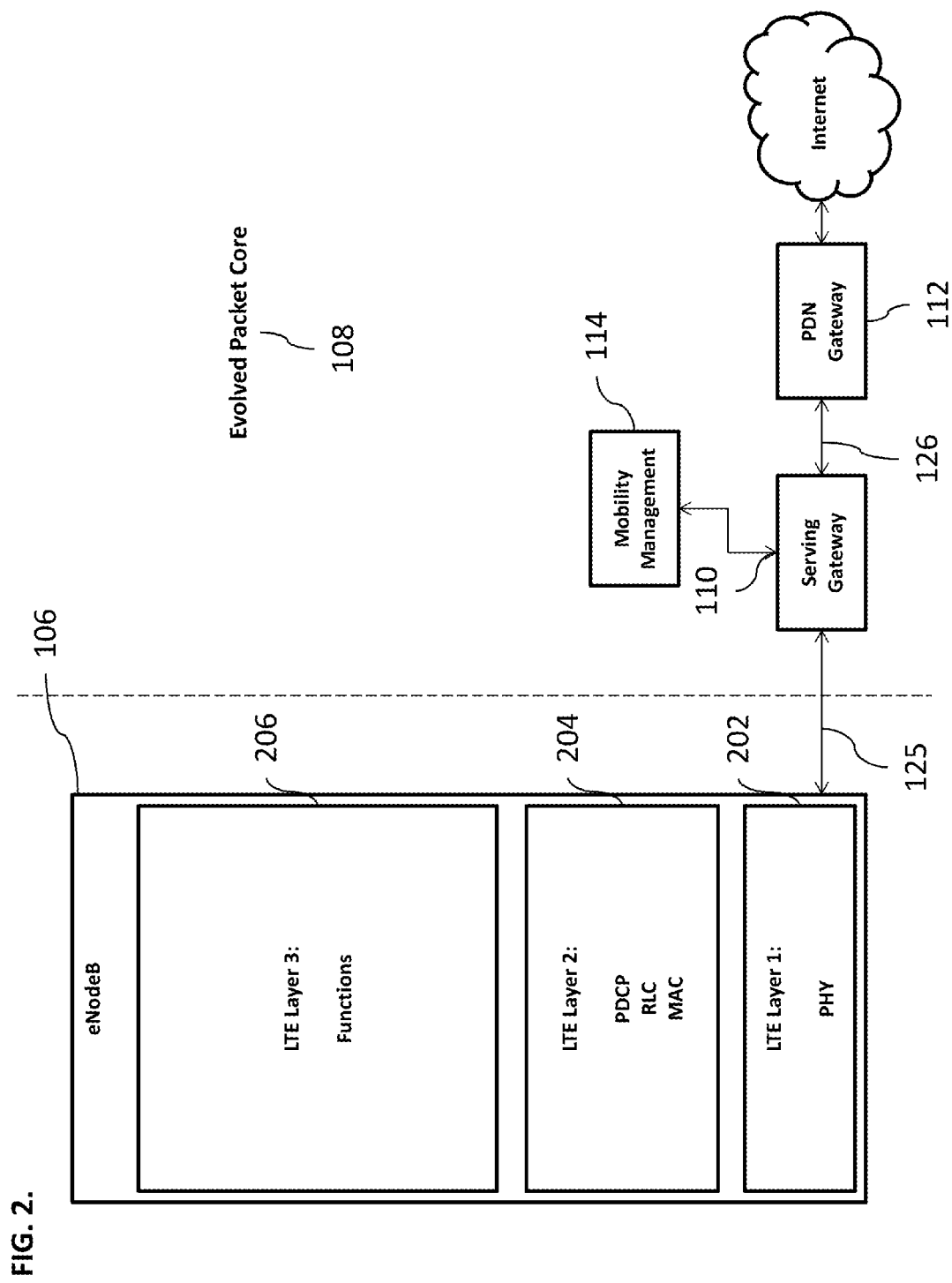
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Intelligent LTE Radio Access Network

Figure 3:
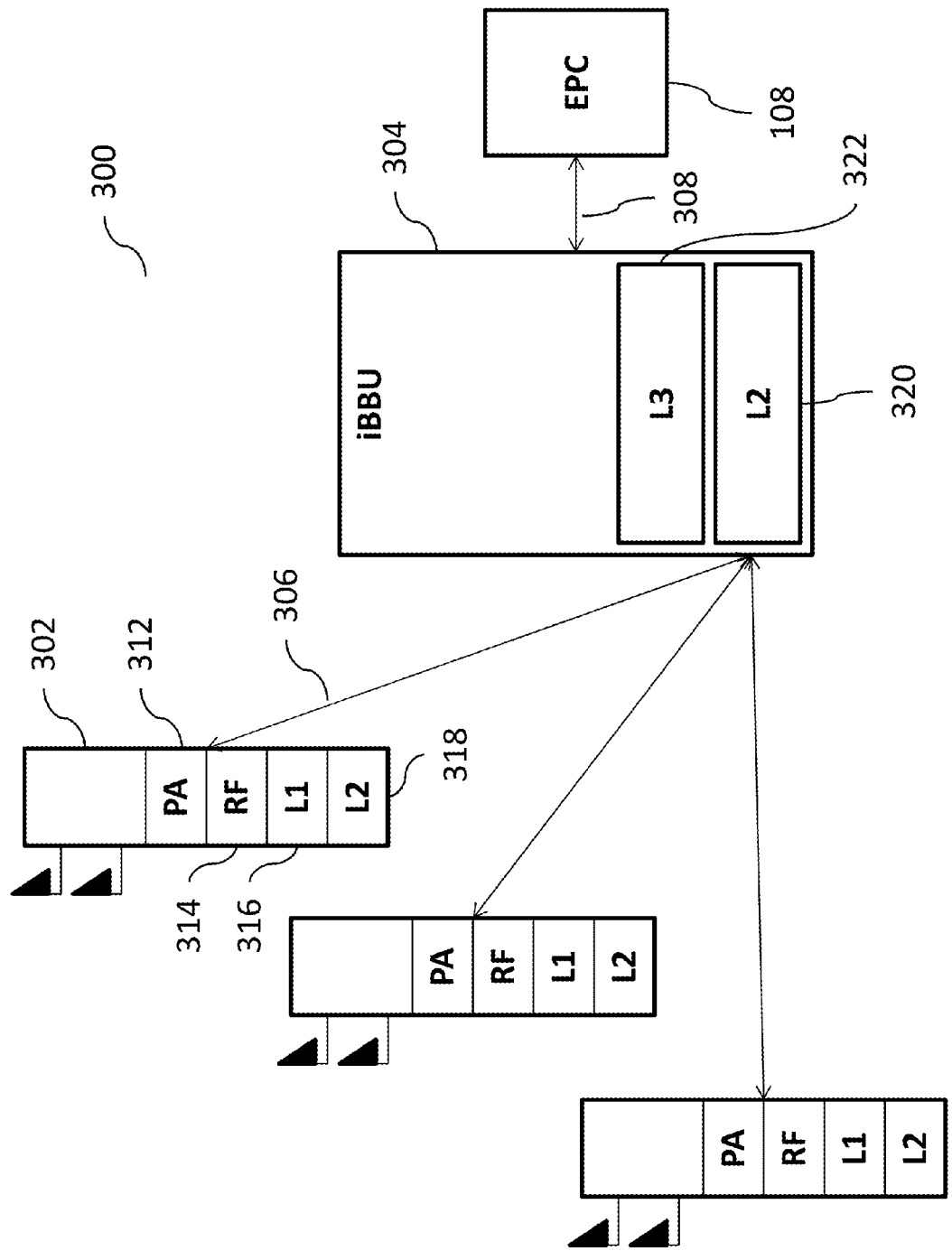
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

IV. Inter-Cell Interference Coordination

To maximize efficiency, long term evolution networks can be designed for frequency reuse. This can mean that in a network having a plurality of cells, the neighboring cells can be using the same frequency channels. This can cause a significant amount of signal interference, which can in turn, result in dropped wireless connections and poor quality of radio signals.

Figure 4:
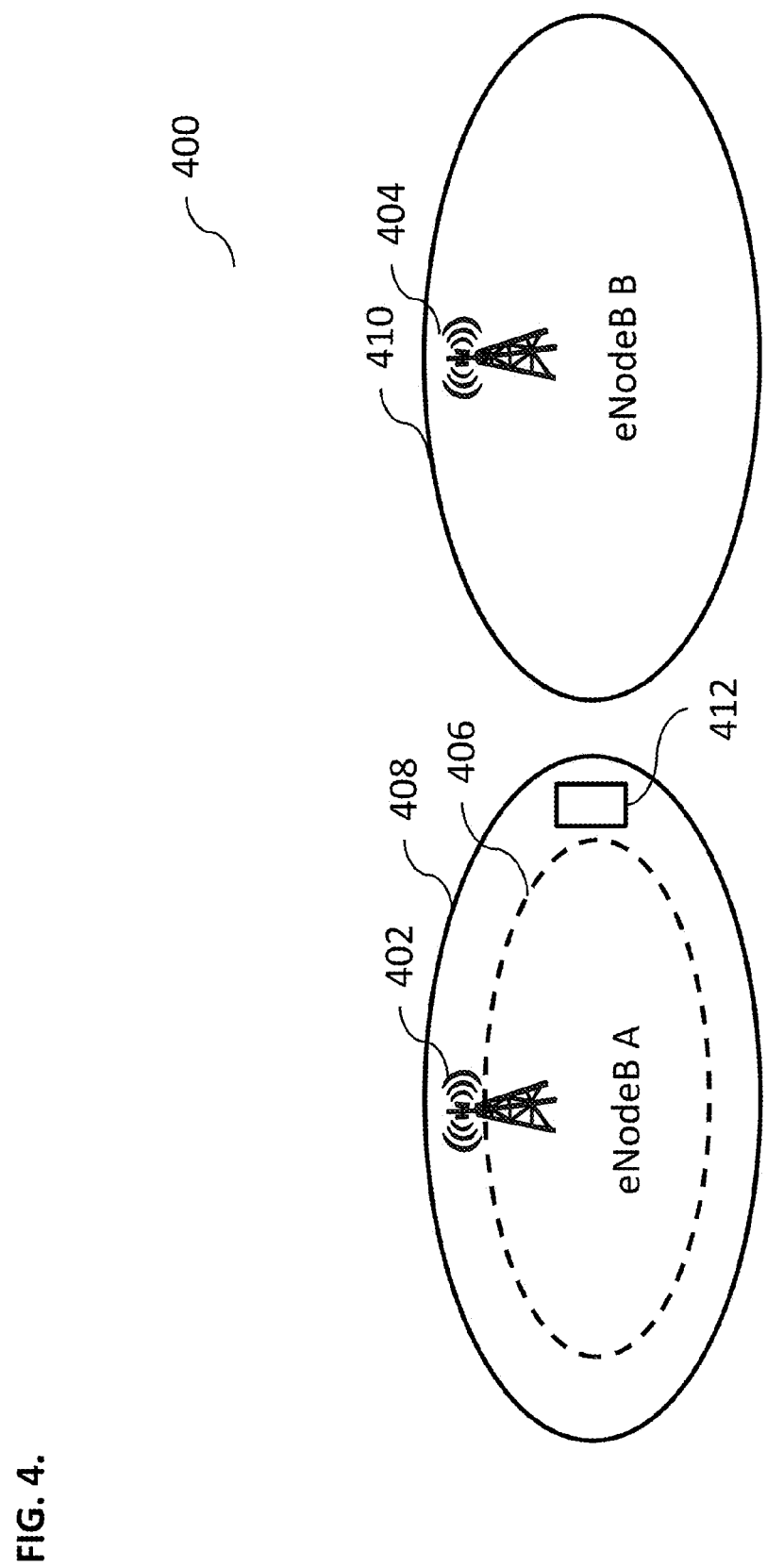
FIG. 4 illustrates an exemplary wireless communications system, where a user equipment can experience cell edge interference.

FIG. 4 illustrates an exemplary system 400 that can include an eNodeB A 402 and an eNodeB B 404. The eNodeB A 402 can include a wireless coverage area 408 and the eNodeB B 404 can include a wireless coverage area 410. Further, as shown in FIG. 4, the eNodeB A 402 can include an area 406 that is located within the eNode A's wireless coverage area, within which user equipment would not experience interference from eNodeB B 404. However, a user equipment 412 that can be located outside the area 406 but within the wireless coverage area 408 can experience interference from the eNodeB B 404. As such, to provide a quality of service to the user equipment 412, an inter-cell interference coordination ("ICIC") may be required (as discussed in 3GPP's 4G LTE, Release 8, standard). The ICIC can apply restrictions to the radio resource management ("RRM") block and can improve favorable channel conditions for user equipments that can be impacted by interference. The ICIC can be used to attain high spectral efficiency. Using ICIC, coordinated resource management can be achieved through fixed, adaptive or real-time coordination using inter-cell signaling (i.e., communication interface among neighboring cells and the received measurement message reports from user equipments), where the signaling rate can vary.

The ICIC can also be used to decrease interference between neighboring macro base stations or macrocells (e.g., high power cellular base station having a large coverage area). This can be achieved by lowering the power of a part of the subchannels in the frequency domain which then can only be received close to the base station. These subchannels do not interfere with the same subchannels used in neighboring cells and thus, data can be sent faster on those subchannels to user equipment that is close to the cell.

In some cases, for user equipment located closer to the edge of a cell (e.g., user equipment 412 that is located near the edge of the cell 408, as shown in FIG. 4), there exists a high probability that a resource block that can be scheduled for that user equipment can also be transmitted by neighbor cell (e.g., eNodeB 404), thereby causing interference, low throughput, call drops, etc. The ICIC can provide interference mitigation from neighboring cells by addressing interference issues at edges of a cell on traffic channels and using power and frequency domain. One exemplary ICIC scheme can used in a situation where neighbor eNodeBs use different sets of resource blocks throughout the cell at a particular time, e.g., no two neighboring eNodeBs use same resource assignments for their user equipment. This can improve cell-edge signal-to-noise ratio ("SINR") but at a cost of decrease in throughput throughout the cell, because full resources blocks are not being utilized. In the alternative scheme, all eNodeBs can use complete range of resource blocks for centrally located users but for cell-edge users, no two neighboring eNodeBs use the same set of resource blocks at particular time. In yet another scheme, all the neighboring eNodeBs use different power schemes across the spectrum while resource block assignment can be according to second scheme discussed above. By way of a non-limiting example, an eNodeB can use power boost for cell edge users with specific set of resources (which are not used by neighboring eNodeBs), while keeping low signal power for centrally located users with availability of all resource blocks. The X2 interface can be used to share the information between the eNodeBs.

Another scheme that has been introduced to mitigate interference between two eNodeBs is called enhanced inter-cell interference coordination ("eICIC") (as discussed in 3GPP's 4G LTE, release 10 standard). The eICIC can be used in the heterogeneous network ("HetNet"), where macro cells can be complemented with micro cell(s) (i.e., low power cellular base station that can cover a limited area, e.g., a mall, a hotel, a transportation hub, etc.) and/or pico cell(s) (i.e., a small cellular base station typically covering a small area, e.g., an office, a shopping mall, a train station, etc.) inside their coverage area. To mitigate interference between a macro cell and several micro/pico cells in its coverage area, eICIC can coordinate blanking of subframes (or almost blanking subframes ("ABS"), which are subframes that do not send any traffic channels and can be mostly control channel frames with very low power) in the time domain in the macro cell. Thus, there would not be interference in those subframes from the macro cell so data transmissions can be much faster. When several micro/pico cells are used in the coverage area of a macro cell, system capacity can be increased as each micro/pico cell can use the ABS subframes without interference from the other micro/pico cells. In some implementations, the system can increase and/or decrease the number of subframes that are assigned for exclusive use of in micro/pico cells' areas when traffic patterns change. Thus, the ICIC is a macro cell interference mitigation scheme and eICIC can be used in the HetNet to reduce interference between the macro and micro/pico layer of a network.

Figure 5:
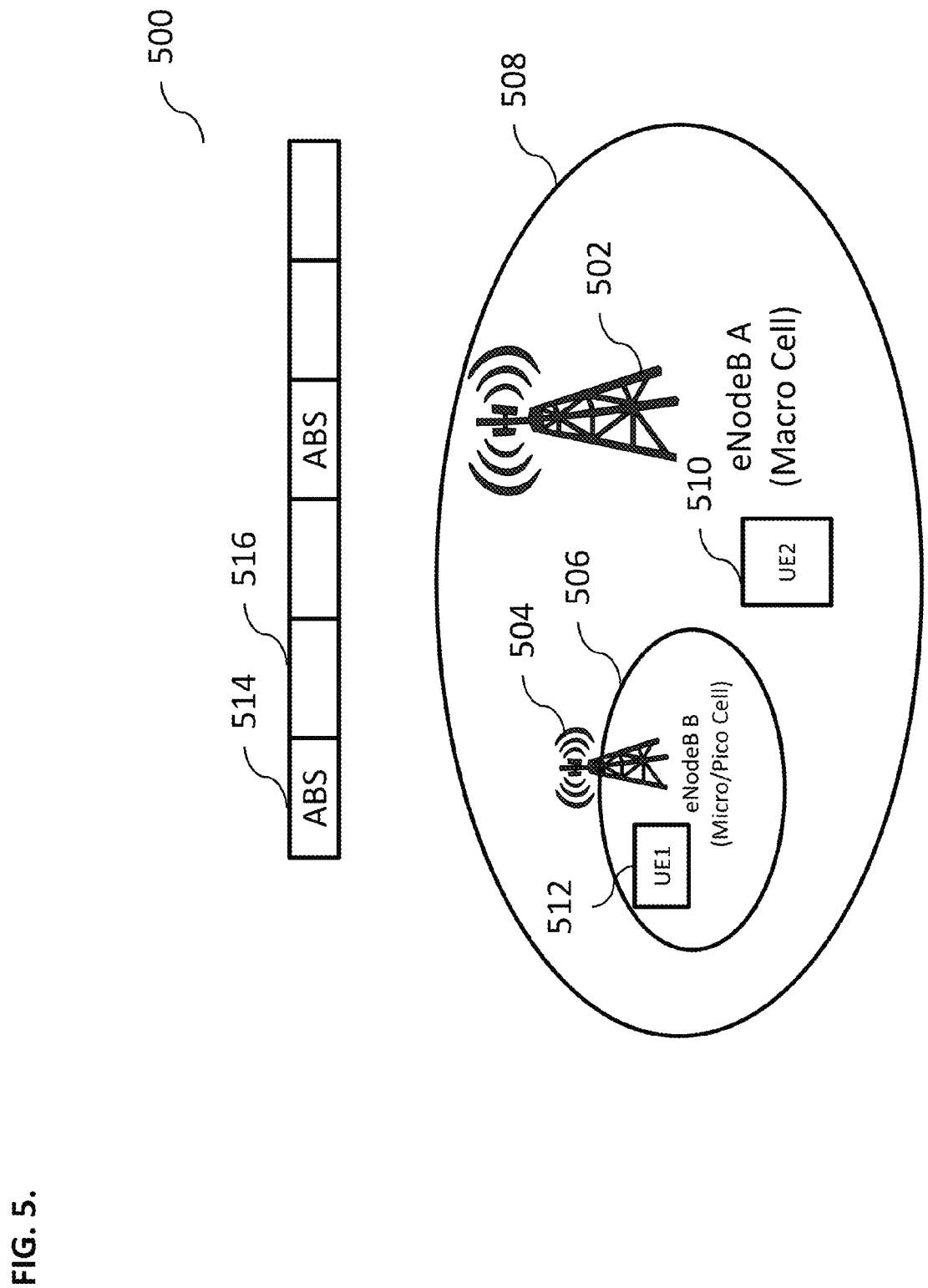
FIG. 5 illustrates an exemplary heterogeneous network system for mitigating interference.

FIG. 5 illustrates an exemplary HetNet system 500 for mitigating interference. The system 500 can include an eNodeB A 502 that can be a macro cell with a cell coverage area 508. The cell coverage area 508 can include one or more eNodeB B 504 having a cell coverage area 506. The eNodeB 504 and its coverage area 506 can be a micro cell (and/or a pico cell, a femto cell, etc.). In view of the eNodeB 504 and its cell coverage area being located within the cell coverage area of the eNodeB 502, an interference can occur. As such, eICIC can be used to mitigate that interference and to designate at least one subframe as an ABS 514 in the sequence of subframes 516 for transmission by the micro cell eNodeB 504. The remaining subframes can be used by the macro cell eNodeB A 502.

Another technique that can be used in connection with interference mitigation involves cell range expansion ("CRE"). The CRE can allow the macro cell to offload its traffic to one or more micro cells (and/or pico cell, femto cell, etc.) that can be located within its cell coverage area. This can increase overall system's capacity. Thus, when macro cell becomes overloaded, it can offload any user equipment that is using the macro cell to one or more micro cells (and/or pico cell, femto cell, etc.), which can be located in the vicinity of the macro cell. The macro cell can perform this function even if the user equipment is receiving a better signal from the macro cell. This will cause expansion of the micro cell's range. To ensure that the user equipment does not fail in the handover process, time domain ICIC can be used and macro cell can use ABS. The user equipment can be configured to perform various measurements on the micro cell (and/or pico cell, femto cell, etc.) when the macro is using ABS.

Figure 6:
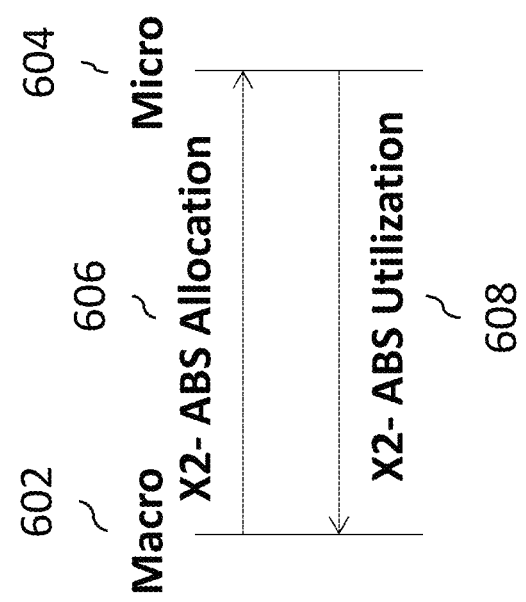
FIG. 6 illustrating an exemplary wireless communications network including a macro cell communicating with a micro cell.

In some implementations, in order to determine how many ABS as well as how much cell range expansion would be required, the macro cell and the micro cell exchange several pieces of information via the X2 interface. In particular, as shown in FIG. 6, the macro cell 602 can transmit ABS allocation to the micro cell 604, which is located within its cell coverage area. The micro cell 604 can interpret the received information to determine what the macro cell 602 wishes to accomplish, including a number of user equipments that the macro cell 602 may handover to the micro cell 604.

After receiving the ABS allocation information from the macro cell 602, the micro cell 604 can transmit its ABS utilization. The ABS utilization can indicate whether or not the micro cell 604 is fully utilized, i.e., it cannot accept any more handover of user equipments from the macro cell 602, or is not fully utilized, i.e., it may be able to accept handover of additional user equipments.

After receiving the information from the micro cell 604, the macro cell 602 can determine whether or not to modify its ABS allocations. This can include addition of further ABS subframes, which can result in reduced macro cell capacity, i.e., fewer subframes will be utilized for transmission of data between the macro cell and user equipments that it is communicating with. In view of the multitude of wireless carriers and/or vendors, it can be difficult to determine the number of ABS subframes and/or amount of CRE that may be needed, as vendors might not share that information with one another. This can result in various problems, including inefficient systems, poor wireless quality, dropped calls, etc.

Figure 7:
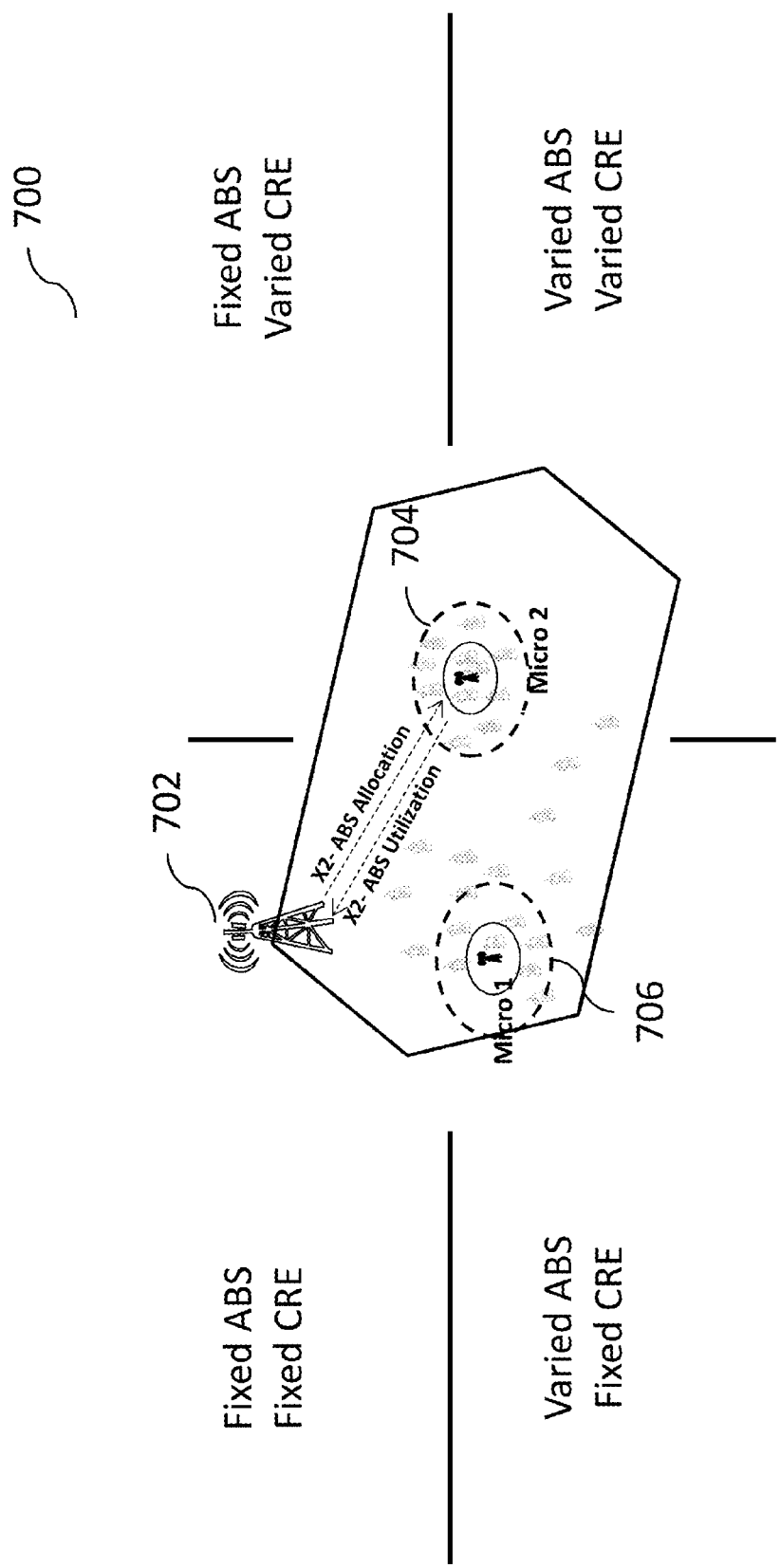
FIG. 7 illustrates conventional solutions for mitigating inter-cell interference coordination.

FIG. 7 illustrates various currently available solutions that attempt to deal with determining the number of ABS as well as amount of CRE that may be needed between a macro cell 702 and at least one micro cell 704, 706 (where each cell 702, 704, 706 can be a base station, such as an eNodeB). As discussed above, the macro cell 702 and micro cells 704, 706 can exchange information relating to the number of ABS allocated by the macro cell 702 and an amount (or percentage) of utilization of the micro cells 704, 706. This information can be exchanged via the X2 interface. One conventional solution can involve fixing the number of ABS that is made available by the macro cell 702 and fixing the amount of CRE. Unfortunately, this solution is the worst performing solution for a multitude of reasons. One of those can include lack of uniform distribution of user equipments in the cell coverage area. Another can be over-utilized micro cells and/or under-utilized micro cells.

Another conventional solution can include fixing a number of ABS that is made available by the macro cell 702 and varying an amount of CRE. This solution also suffers from a drawback, as it is not capable of adapting to varying traffic loads.

Further conventional solution can involve varying a number of ABS that is made available by the macro cell 702 and fixing an amount of CRE. This can create unbalanced traffic patterns, which can result in an inefficient network and poor quality of wireless signal.

Lastly, another conventional solution involves varying both the number of ABS and the amount of CRE. However, this solution requires that different vendors or carriers share proprietary information among themselves to determine the number of ABS and/or amount of CRE needed. Alternatively, it requires that the same vendor or carrier implement both the macro cell and the micro cell, which may be impossible in some geographical regions.

In some implementations, the current subject matter provides a solution to the problem of determining a number of ABS and/or an amount of CRE that may be needed to implement an efficient wireless network. In some implementations, the current subject matter can use information concerning traffic loads during a specific time of day to optimize ABS and/or CRE information on a per cell basis. In some implementations, the current subject matter can implement a table that can contain this information. The table can be continuously updated with traffic load information on a per time of day basis. The table can be a database stored in a storage location at a base station (such as an eNodeB). The table can be stored at a macro cell eNodeB and/or micro cell eNodeB (or any other size cell). The information can be used to determine the number of ABS that should be made available by the macro cell and/or the amount of CRE that may be needed.

In some implementations, the traffic load information can be determined and/or optimized using a self-organizing, self-optimizing network ("SON") function that can increase network performance and quality reacting to dynamic processes in the network. The SON function can minimize life cycle cost of running a network by eliminating manual configuration of equipment from deployment to dynamically optimizing radio network performance during operation. The SON function has been introduced in the 3GPP LTE Standard, Release 8.

Figure 8:
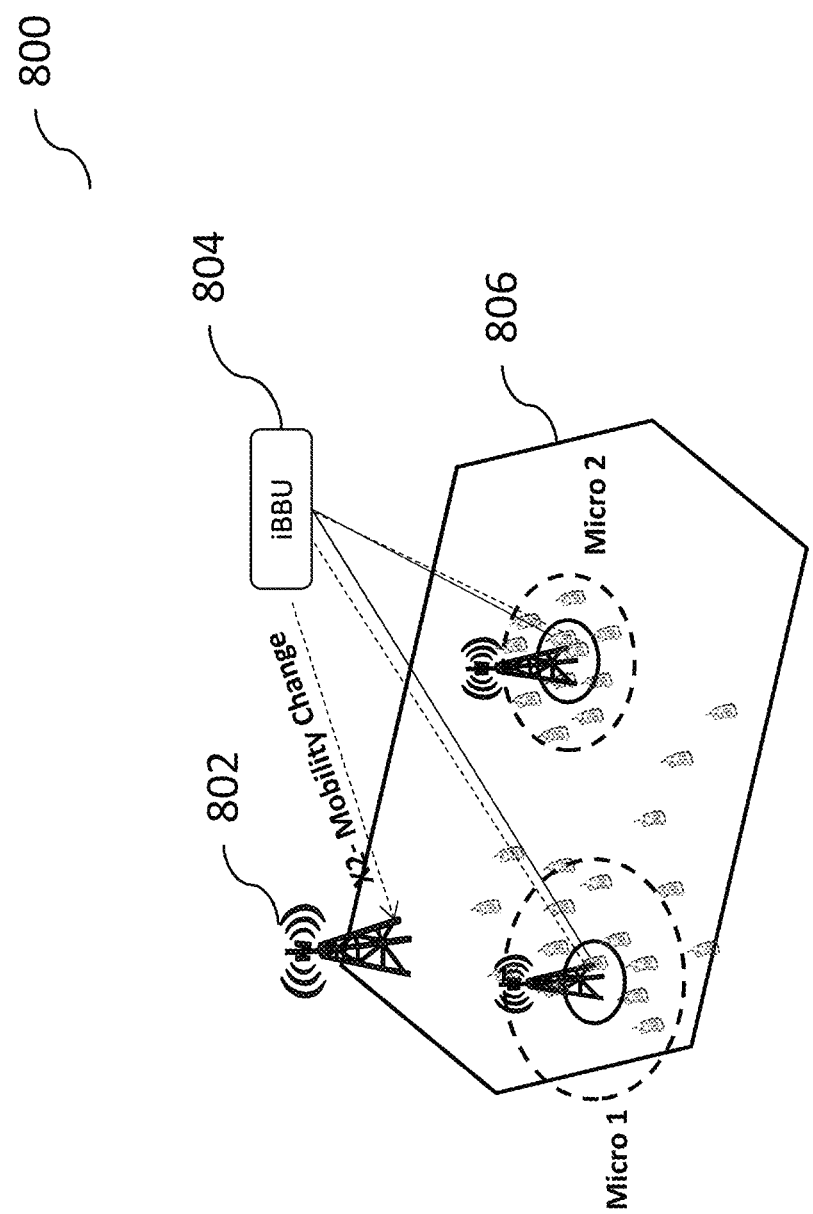
FIG. 8 illustrates an exemplary system for optimizing an enhanced inter-cell interference coordination, according to some implementations of the current subject matter.

FIG. 8 illustrates an exemplary system 800 for optimizing an enhanced inter-cell interference coordination, according to some implementations of the current subject matter. The system 800 can include a macro cell 802 and two micro cells ("Micro 1" and "Micro 2") that can be located within the cell coverage area 806 of the macro cell 802. The micro cells can include an intelligent eNodeB (or an iBBU), such as the one discussed above and shown in connection with FIG. 3. For the purposes of simplifying FIG. 8, the eNodeBs of each of the micro cells are illustrated as iBBU 804. As can be understood, each micro cell can include its own iBBU and/or an eNodeB and that each iBBU/eNodeB can perform the functionalities described below.

In some implementations, the iBBU 804 can store information concerning cell traffic load at a particular time of day. The iBBU 804 can also be provided with information on a number of ABS that has been allocated by the macro cell 802. The iBBU 804 can also implement a SON function to determine/optimize an average user session throughput target information at a particular time of day given the number of ABS allocated. The iBBU can also implement a mobility load balancing ("MLB") mechanism to achieve optimal cell range extension to adapt to traffic distribution and load conditions. This can allow balancing of traffic/load between the macro cells and micro cells as well as capturing more traffic during busiest time of day. MLB is a function that allows congested cells to transfer load to other cells that have available resources. MLB provides for load reporting between eNodeBs to exchange information about load level and available capacity. As shown in FIG. 8, the iBBU 804 can report to the macro cell 802 with its load information over the X2 interface. In some implementations, the iBBU 804 can provide a basic mobility parameter only to the macro cell 802. In some cases, the reporting done by iBBU 804 can include hardware load, S1 transport network load and radio resource status. The radio resource status reports are separated in uplink and downlink reports, including the total allocation guaranteed and non-guaranteed bit rate traffic, the percentage of allocated physical resource block ("PRB") and the percentage of PRBs available for load balancing.

In some implementations, using the information reported by the iBBU 804 (as determined at least based on the available ABS and optimized load information at a particular time of day), the macro cell 802 can determine whether or not to handover one or more user equipments being serviced by the macro cells to one or more micro cells. The macro cell

802 can also make a determination which user equipment is to be handed over to which micro cell.

Figure 9:
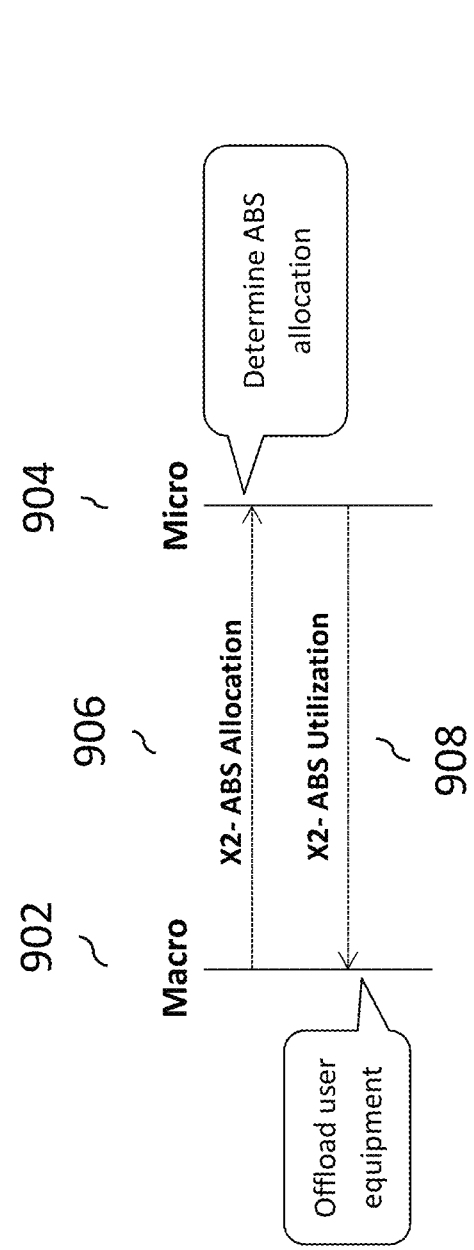
FIG. 9 illustrates an exemplary dynamic enhanced inter-cell interference coordination system, according to some implementations of the current subject matter.

FIG. 9 illustrates an exemplary dynamic enhanced inter-cell interference coordination system 900, according to some implementations of the current subject matter. The system 900 can include a macro cell 902 and a micro cell 904. The micro cell 904 can be located in the wireless coverage area of the macro cell 902 and can be configured to communicate with the macro cell 902. The macro cell 902 and the micro cell 904 can include an eNodeB (and/or an iBBU), as discussed above in connection with FIGS. 1*a*-3. The macro cell 902 can transmit to the micro cell 904 a number of ABS allocated by the macro cell, at 906. The information can be transmitted via the X2 interface. Based on the transmitted number of the allocated ABS, the micro cell 904 can determine a target user throughput.

FIG. 10 illustrates an exemplary table 1000 containing target average user throughput on a micro cell in view of the allocated number of almost blanking subframes (out of 10 subframes), according to some implementations of the current subject matter. For example, an average user throughput would be 0.8 mbps for only 1 ABS allocated by the macro cell. The average target throughput can decrease for more ABS allocated by the macro cell. For example, if 8 subframes are allocated as almost blanking subframes by the macro cell 902, the average target throughput would decrease to 0.2 mbps. As can be understood, the average target throughput can vary and is not limited to the throughput illustrated in FIG. 10.

Referring back to FIG. 9, upon determining the average target user throughput on the micro cell, micro cell 904 can report its utilization of the ABS to the macro cell 902. Such reporting can be performed via the X2 interface. Based on the received information the macro cell 902 can offload user equipments that are currently being serviced by the macro cell 902 to the micro cell if the reported utilization of the ABS is less than 100%.

In some implementations, the amount of ABS allocation can be mapped to a level of cell load and/or a targeted average user throughput for the micro cell. The SON function can be used to generate this mapping. The function can use statistical analysis of macro cell's ABS allocation versus macro cell's load. Such information can be obtained from publicly available resources and hence does not require vendor-to-vendor cooperation. The micro cell can report ABS utilization based on an actual average user throughput compared to targeted average user throughput that has been previously determined. Once the macro cell receives information from the micro cell, the macro cell can handover the user equipments to the micro cell (given micro cell's available capacity) and can continue to handover more user equipments to the micro cell if the allocated ABS have not been fully utilized. In some implementations, depending on the traffic/load conditions, the macro cell 902 can allocate further ABS, which in turn can allow further off-loading of the user equipments to micro cell 904. The above information can be exchanged using two messages over the X2 interface. In some implementations, the CRE can be independently maintained based on handover statistics.

In some implementations, when the micro cell 904 has reported less than 100% utilization (or less than a predetermined threshold utilization), the macro cell 902 can determine whether or not to reduce the number of ABS that has been allocated. Reducing the number of allocated ABS can depend on the traffic/load conditions and/or a particular time of day and/or any other factors. This can allow for further management/balancing of the network conditions. In some implementations, the micro cell can handover the user equipments that have been previously handed over to it by the macro cell back to the macro cell. This can occur when traffic/load conditions can be light, the micro cell is not fully utilizing the allocated ABS, and/or any other factors.

The current subject matter can significantly improve the conventional solutions (shown in FIG. 7) by providing a more efficient balancing of network traffic as well achieving a dynamic cell range expansion. In some cases (e.g., fixed ABS and varying CRE), the current subject matter can provide for an optimal cell range expansion. Further, in situations, where the networks operate based on varying ABS and varying CRE, the current subject matter can operate without requirement for proprietary knowledge that may be required because different cells are operated by different vendors/carriers.

Figures 11A, 11B:
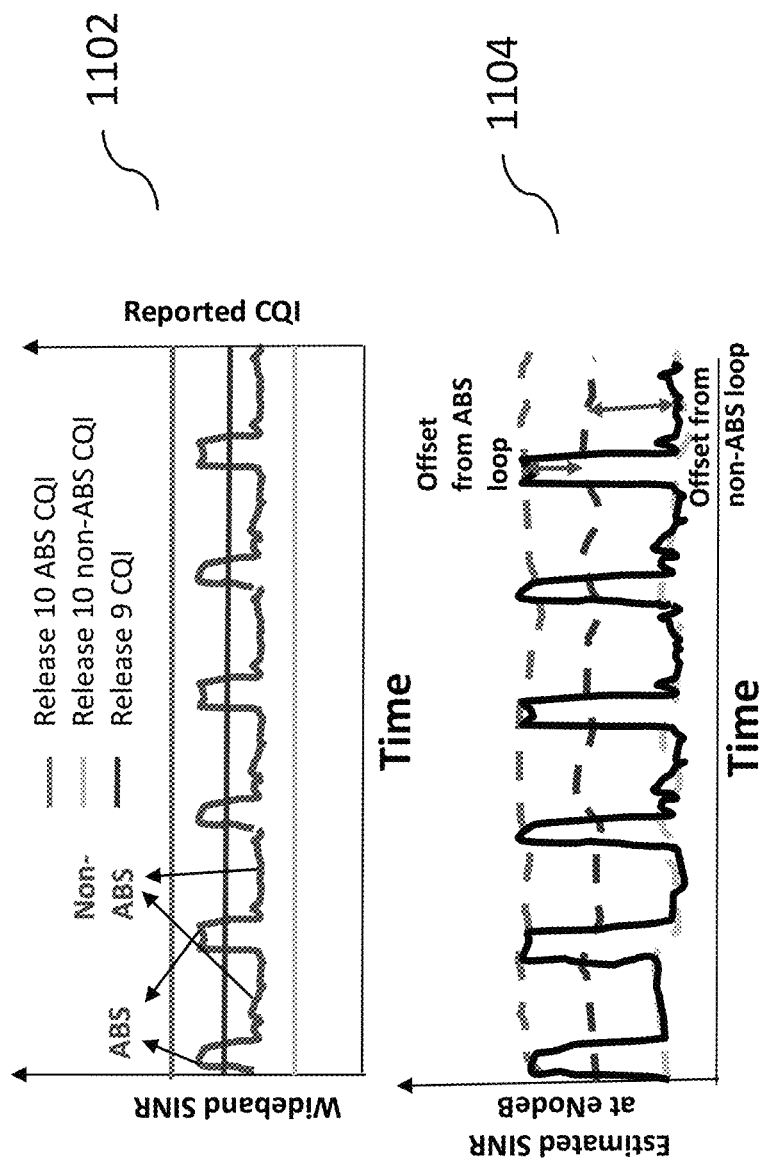
FIGS. 11a and 11b illustrate various exemplary performance plots indicating performance improvement achieved using the current subject matter system.

In some implementations, the current subject matter can also be beneficial to improving user equipments operating using 3GPP LTE Standard, Releases 8 and 9. In particular, the current subject matter can run two separate rate adaptation loops depending on whether data transmission is scheduled in a macro ABS subframe or non-ABS subframe. Further, the current subject matter can allow for dual rate adaptation that can compensate for over/under estimation of interference. FIGS. 11*a* and 11*b* illustrate various exemplary performance plots 1102 and 1104 indicating performance improvement achieved using the current subject matter system.

In some implementations, as discussed above, upon receiving the ABS allocation information from the macro cell, the micro cell can provide a load information. The load information can be determined based on at least one of the following: a time of day and can be configured statically; a SON function that takes operational measurements information obtained from the macro cell and micro cell as parameters; and an ABS allocation using a mapping of ABS allocation to a load table which can be statically configured. The configuration of the ABS allocation to the load table can also be aided by the SON function based on operational measurements information obtained from the macro cell and micro cell. The load information can include at least one of the following: a number of users and cell throughput; a target user throughput; and a target proportional fair metric. In some implementations, the CRE information can be exchanged between cells using the mobility change request ("MCR") procedures over the X2 interface. The CRE information can be also inferred from the information acquired during the handover procedure between the macro cell and micro cell. Further, link adaptation can be based on ABS/non-ABS allocations by different offsets of the reported CQI from the user equipment. In some implementations, the above information can be exchanged using messages over the X2 interface, where the messages are coordinated by the RRC/RRM and/or other components of an eNodeB (or an iBBU), as discussed above and shown in FIG. 3.

Figure 12:
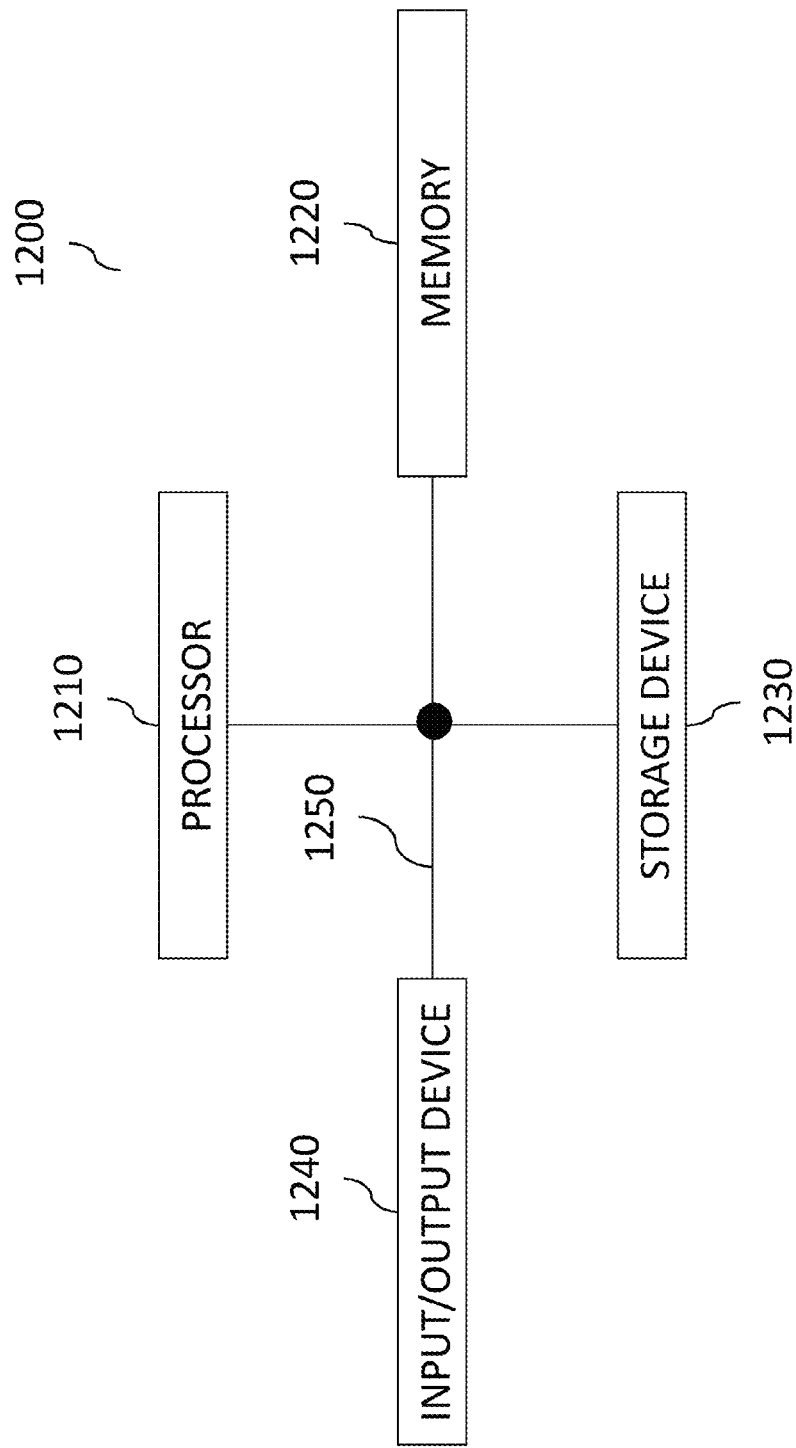
FIG. 12 illustrates an exemplary system, according to some implementations of the current subject matter.

In some implementations, the current subject matter can be configured to be implemented in a system 1200, as shown in FIG. 12. The system 1200 can include one or more of a processor 1210, a memory 1220, a storage device 1230, and an input/output device 1240. Each of the components 1210, 1220, 1230 and 1240 can be interconnected using a system bus 1250. The processor 1210 can be configured to process instructions for execution within the system 600. In some implementations, the processor 1210 can be a single-threaded processor. In alternate implementations, the processor 1210 can be a multi-threaded processor. The processor 1210 can be further configured to process instructions stored in the memory 1220 or on the storage device 1230, including receiving or sending information through the input/output device 1240. The memory 1220 can store information within the system 1200. In some implementations, the memory 1220 can be a computer-readable medium. In alternate implementations, the memory 1220 can be a volatile memory unit. In yet some implementations, the memory 1220 can be a non-volatile memory unit. The storage device 1230 can be capable of providing mass storage for the system 1200. In some implementations, the storage device 1230 can be a computer-readable medium. In alternate implementations, the storage device 1230 can be a floppy disk device, a hard disk device, an optical disk device, a tape device, non-volatile solid state memory, or any other type of storage device. The input/output device 1240 can be configured to provide input/output operations for the system 1200. In some implementations, the input/output device 1240 can include a keyboard and/or pointing device. In alternate implementations, the input/output device 1240 can include a display unit for displaying graphical user interfaces.

Figure 13:
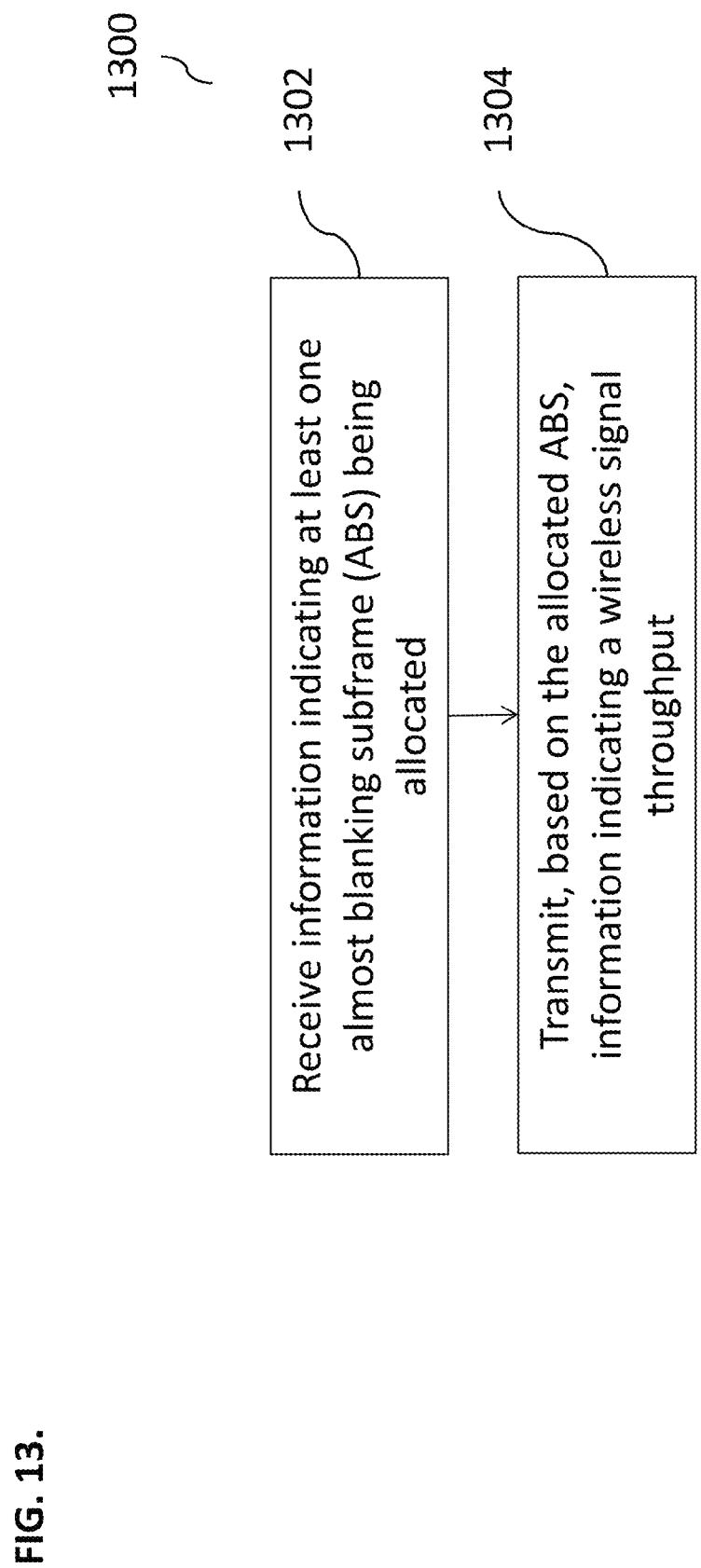
FIG. 13 illustrates an exemplary method, according to some implementations of the current subject matter.

FIG. 13 illustrates an exemplary method 1300 for providing an enhanced inter-cell interference coordination, according to some implementations of the current subject matter. The method 1300 can be performed by a micro cell (such as a micro cell 904 shown in FIG. 9). At 1302, information indicating at least one almost blanking subframe (ABS) being allocated can be received by a micro cell from a macro cell (such as a macro cell 902 shown in FIG. 9). At 1304, based on based on the allocated ABS, the micro cell can transmit information indicating a wireless signal throughput to the macro cell. In some implementations, the current subject matter can include one or more optional features discussed above and recited in the claims herein below.

In some implementations, the current subject matter can include one or more of the following optional features. An evolved node (eNodeB) base station having a processor and a memory can be configured to perform the receiving and the transmitting of the method 1300 shown in FIG. 13. In some implementations, the traffic throughput information can be determined based on a time of day during which at least one wireless signal is being processed by the processor. The processor can use a self-optimizing function to optimize the wireless signal throughput information. The wireless signal throughput information can include at least one of the following: a number of user equipments communicating with the eNodeB, a resource utilization at the eNodeB, a target user equipment throughput information, and a target proportional fair metric. The processor can transmit cell range expansion information. The eNodeB can be a micro cell communicating with at least one macro cell. In some implementations, the micro cell can transmit an indication of utilization of ABS subframes to the macro cell. For example, an indication that the ABS subframes are fully utilized can correspond to the micro cell being fully utilized and being unable to accept handover of additional user equipment from the macro cell. An indication that the ABS subframes are not fully utilized can correspond to the micro cell being not fully utilized and being able to accept handover of additional user equipment from the macro cell. In some implementations, the macro cell, based on the indication of ABS subframes utilization, can determine whether to modify ABS subframe allocation. Modification of ABS subframe allocation can include at least one of the following: increasing a number of ABS subframes allocated, decreasing the number of ABS subframes allocated, and unchanging the number of ABS subframes allocated.

Figure 14:
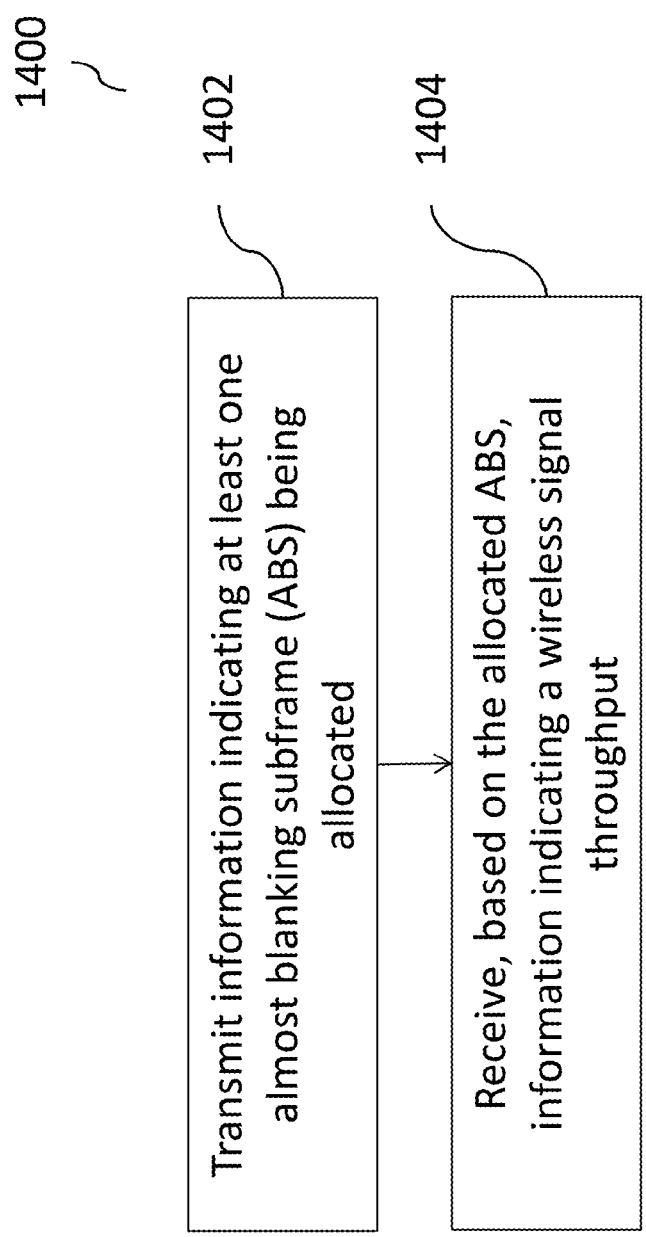
FIG. 14 illustrates another exemplary method, according to some implementations of the current subject matter.

FIG. 14 illustrates an exemplary method 1400 for providing an enhanced inter-cell interference coordination, according to some implementations of the current subject matter. The method 1400 can be performed by a macro cell (such as a macro cell 902 shown in FIG. 9). At 1402, the macro cell can transmit information indicating at least one almost blanking subframe (ABS) being allocated to a micro cell (such as a micro cell 904 shown in FIG. 9). At 1404, based on the allocated ABS, the macro cell can receive information indicating a wireless signal throughput. In some implementations, the current subject matter can include one or more optional features discussed above and recited in the claims herein below.

In some implementations, the current subject matter can include one or more of the following optional features. In some implementations, an evolved node (eNodeB) base station having a processor and a memory can perform the transmitting and the receiving of the method 1400 shown in FIG. 14. The traffic throughput information can be determined based on a time of day during which at least one wireless signal is being processed by the at least one processor. The wireless signal throughput information can be optimized using a self-optimizing network function. The wireless signal throughput information can include at least one of the following: a number of user equipments communicating with the eNodeB, a resource utilization at the eNodeB, a target user equipment throughput information, and a target proportional fair metric. The processor can receive cell range expansion information. Based on the received cell range expansion information, the macro cell can determine at least one of the following: additional number of user equipments for handover to the micro cell, a handover parameter, additional bandwidth to be allocated for use by the user equipments communicating with the eNodeB, and a remaining bandwidth of the macro cell. The eNodeB can be a macro cell communicating with at least one micro cell. In some implementations, the macro cell can receive an indication of utilization of ABS subframes from the micro cell. An indication that the ABS subframes are fully utilized can correspond to the micro cell being fully utilized and being unable to accept handover of additional user equipment from the macro cell. An indication that the ABS subframes are not fully utilized can correspond to the micro cell being not fully utilized and being able to accept handover of additional user equipment from the macro cell. In some implementations, the macro cell, based on the indication of ABS subframes utilization, can determine whether to modify ABS subframe allocation. Modification of ABS subframe allocation can include at least one of the following: increasing a number of ABS subframes allocated, decreasing the number of ABS subframes allocated, and unchanging the number of ABS subframes allocated.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A device for providing an enhanced inter-cell interference coordination, the device comprising:
   at least one memory; and
   at least one processor operatively coupled to the memory, the at least one processor being configured to:
      receive information indicating at least one almost blanking subframe (ABS) being allocated;
      determine a number of ABS being utilized and an amount of cell range expansion required; and
      transmit, based on the allocated ABS, the number of ABS being utilized and the amount of cell range expansion required, information indicating a wireless signal throughput.

2. The device according to claim 1, further comprising an evolved node (eNodeB) base station, the eNodeB base station comprising the at least one processor and the at least one memory.

3. The device according to claim 2, wherein the traffic throughput information is determined based on a time of day during which at least one wireless signal is being processed by the at least one processor.

4. The device according to claim 2, wherein the at least one processor uses a self-optimizing function to optimize the wireless signal throughput information.

5. The device according to claim 2, wherein the wireless signal throughput information includes at least one of the following: a number of user equipments communicating with the eNodeB, a resource utilization at the eNodeB, a target user equipment throughput information, and a target proportional fair metric.

6. The device according to claim 5, wherein the at least one processor is further configured to transmit cell range expansion information.

7. The device according to claim 6, wherein the eNodeB is a micro cell communicating with at least one macro cell.

8. The device according to claim 7, wherein the micro cell transmits an indication of utilization of ABS subframes to the macro cell;
wherein
an indication that the ABS subframes are fully utilized corresponds to the micro cell being fully utilized and being unable to accept handover of additional user equipment from the macro cell; and
an indication that the ABS subframes are not fully utilized corresponds to the micro cell being not fully utilized and being able to accept handover of additional user equipment from the macro cell.

9. The device according to claim 8, wherein the macro cell, based on the indication of ABS subframes utilization, determines whether to modify ABS subframe allocation, wherein modification of ABS subframe allocation includes at least one of the following: increasing a number of ABS subframes allocated, decreasing the number of ABS subframes allocated, and unchanging the number of ABS subframes allocated.

10. A computer-implemented method for providing an enhanced inter-cell interference coordination, the method comprising:
receiving information indicating at least one almost blanking subframe (ABS) being allocated;
determining a number of ABS being utilized and an amount of cell range expansion required; and
transmitting, based on the receiving and determining, information indicating a wireless signal throughput.

11. The method according to claim 10, wherein an evolved node (eNodeB) base station, the eNodeB base station comprising the at least one processor and the at least one memory, is configured to perform the receiving and the transmitting.

12. The method according to claim 11, wherein the traffic throughput information is determined based on a time of day during which at least one wireless signal is being processed by the at least one processor.

13. The method according to claim 11, wherein the at least one processor uses a self-optimizing function to optimize the wireless signal throughput information.

14. The method according to claim 11, wherein the wireless signal throughput information includes at least one of the following: a number of user equipments communicating with the eNodeB, a resource utilization at the eNodeB, a target user equipment throughput information, and a target proportional fair metric.

15. The method according to claim 14, wherein the at least one processor is further configured to transmit cell range expansion information.

16. The method according to claim 15, wherein the eNodeB is a micro cell communicating with at least one macro cell.

17. The method according to claim 16, wherein the micro cell transmits an indication of utilization of ABS subframes to the macro cell;
wherein
an indication that the ABS subframes are fully utilized corresponds to the micro cell being fully utilized and being unable to accept handover of additional user equipment from the macro cell; and
an indication that the ABS subframes are not fully utilized corresponds to the micro cell being not fully utilized and being able to accept handover of additional user equipment from the macro cell.

18. The method according to claim 17, wherein the macro cell, based on the indication of ABS subframes utilization, determines whether to modify ABS subframe allocation, wherein modification of ABS subframe allocation includes at least one of the following: increasing a number of ABS subframes allocated, decreasing the number of ABS subframes allocated, and unchanging the number of ABS subframes allocated.

19. A computer program product, for providing an enhanced inter-cell interference coordination, comprising a non-transitory machine-readable medium storing instructions that, when executed by at least one programmable processor, cause the at least one programmable processor to perform operations comprising:
receiving information indicating at least one almost blanking subframe (ABS) being allocated;
determining a number of ABS being utilized and an amount of cell range expansion required; and
transmitting, based on the receiving and determining, information indicating a wireless signal throughput.

20. The computer program product according to claim 19, wherein an evolved node (eNodeB) base station, the eNodeB base station comprising the at least one processor and the at least one memory, is configured to perform the receiving and the transmitting.

21. The computer program product according to claim 20, wherein the traffic throughput information is determined based on a time of day during which at least one wireless signal is being processed by the at least one processor.

22. The computer program product according to claim 20, wherein the at least one processor uses a self-optimizing function to optimize the wireless signal throughput information.

23. The computer program product according to claim 20, wherein the wireless signal throughput information includes at least one of the following: a number of user equipments communicating with the eNodeB, a resource utilization at the eNodeB, a target user equipment throughput information, and a target proportional fair metric.

24. The computer program product according to claim 23, wherein the at least one processor is further configured to transmit cell range expansion information.

25. The computer program product according to claim 24, wherein the eNodeB is a micro cell communicating with at least one macro cell.

26. The computer program product according to claim 25, wherein the micro cell transmits an indication of utilization of ABS subframes to the macro cell;
wherein
an indication that the ABS subframes are fully utilized corresponds to the micro cell being fully utilized and being unable to accept handover of additional user equipment from the macro cell; and
an indication that the ABS subframes are not fully utilized corresponds to the micro cell being not fully utilized and being able to accept handover of additional user equipment from the macro cell.

27. The computer program product according to claim 26, wherein the macro cell, based on the indication of ABS subframes utilization, determines whether to modify ABS subframe allocation, wherein modification of ABS subframe allocation includes at least one of the following: increasing a number of ABS subframes allocated, decreasing the number of ABS subframes allocated, and unchanging the number of ABS subframes allocated.

28. A device for providing an enhanced inter-cell interference coordination, the device comprising:
at least one memory; and
at least one processor operatively coupled to the memory, the at least one processor being configured to:
transmit information indicating at least one almost blanking subframe (ABS) being allocated;
determine a number of ABS being utilized and an amount of cell range expansion required; and
receive, based on the allocated ABS, and number of ABS utilized and the amount of cell range expansion required, information indicating a wireless signal throughput.

29. The device according to claim 28, further comprising an evolved node (eNodeB) base station, the eNodeB base station comprising the at least one processor and the at least one memory.

30. The device according to claim 29, wherein the traffic throughput information is determined based on a time of day during which at least one wireless signal is being processed by the at least one processor.

31. The device according to claim 30, wherein the wireless signal throughput information is optimized using a self-optimizing network function.

32. The device according to claim 29, wherein the wireless signal throughput information includes at least one of the following: a number of user equipments communicating with the eNodeB, a resource utilization at the eNodeB, a target user equipment throughput information, and a target proportional fair metric.

33. The device according to claim 32, wherein the at least one processor is further configured to receive cell range expansion information;
wherein the at least one processor, based on the received cell range expansion information, determines at least one of the following: additional number of user equipments for handover to the micro cell, a handover parameter, additional bandwidth to be allocated for use by the user equipments communicating with the eNodeB, and a remaining bandwidth of the macro cell.

34. The device according to claim 33, wherein the eNodeB is a macro cell communicating with at least one micro cell.

35. The device according to claim 34, wherein the macro cell receives an indication of utilization of ABS subframes from the micro cell;
wherein
an indication that the ABS subframes are fully utilized corresponds to the micro cell being fully utilized and being unable to accept handover of additional user equipment from the macro cell; and
an indication that the ABS subframes are not fully utilized corresponds to the micro cell being not fully utilized and being able to accept handover of additional user equipment from the macro cell.

36. The device according to claim 35, wherein the macro cell, based on the indication of ABS subframes utilization, determines whether to modify ABS subframe allocation, wherein modification of ABS subframe allocation includes at least one of the following: increasing a number of ABS subframes allocated, decreasing the number of ABS subframes allocated, and unchanging the number of ABS subframes allocated.

37. A computer-implemented method for providing an enhanced inter-cell interference coordination, the method comprising:
transmitting information indicating at least one almost blanking subframe (ABS) being allocated;
determining a number of ABS being utilized and an amount of cell range expansion required; and
receiving, based on the transmitting and determining, information indicating a wireless signal throughput.

38. The method according to claim 37, wherein an evolved node (eNodeB) base station, the eNodeB base station comprising the at least one processor and the at least one memory is configured to perform the transmitting and the receiving.

39. The method according to claim 38, wherein the traffic throughput information is determined based on a time of day during which at least one wireless signal is being processed by the at least one processor.

40. The method according to claim 39, wherein the wireless signal throughput information is optimized using a self-optimizing network function.

41. The method according to claim 38, wherein the wireless signal throughput information includes at least one of the following: a number of user equipments communicating with the eNodeB, a resource utilization at the eNodeB, a target user equipment throughput information, and a target proportional fair metric.

42. The method according to claim 41, wherein the at least one processor is further configured to receive cell range expansion information;
wherein the at least one processor, based on the received cell range expansion information, determines at least one of the following: additional number of user equipments for handover to the micro cell, a handover parameter, additional bandwidth to be allocated for use by the user equipments communicating with the eNodeB, and a remaining bandwidth of the macro cell.

43. The method according to claim 42, wherein the eNodeB is a macro cell communicating with at least one micro cell.

44. The method according to claim 43, wherein the macro cell receives an indication of utilization of ABS subframes from the micro cell;
wherein
an indication that the ABS subframes are fully utilized corresponds to the micro cell being fully utilized and being unable to accept handover of additional user equipment from the macro cell; and
an indication that the ABS subframes are not fully utilized corresponds to the micro cell being not fully utilized and being able to accept handover of additional user equipment from the macro cell.

45. The method according to claim 44, wherein the macro cell, based on the indication of ABS subframes utilization, determines whether to modify ABS subframe allocation, wherein modification of ABS subframe allocation includes at least one of the following: increasing a number of ABS subframes allocated, decreasing the number of ABS subframes allocated, and unchanging the number of ABS subframes allocated.

46. A computer program product, for providing an enhanced inter-cell interference coordination, comprising a non-transitory machine-readable medium storing instructions that, when executed by at least one programmable processor, cause the at least one programmable processor to perform operations comprising:
   transmitting information indicating at least one almost blanking subframe (ABS) being allocated;
   determining a number of ABS being utilized and an amount of cell range expansion required; and
   receiving, based on the transmitting and determining, information indicating a wireless signal throughput.

47. The computer program product according to claim 46, wherein an evolved node (eNodeB) base station, the eNodeB base station comprising the at least one processor and the at least one memory, is configured to perform the transmitting and the receiving.

48. The computer program product according to claim 47, wherein the traffic throughput information is determined based on a time of day during which at least one wireless signal is being processed by the at least one processor.

49. The computer program product according to claim 48, wherein the wireless signal throughput information is optimized using a self-optimizing network function.

50. The computer program product according to claim 48, wherein the wireless signal throughput information includes at least one of the following: a number of user equipments communicating with the eNodeB, a resource utilization at the eNodeB, a target user equipment throughput information, and a target proportional fair metric.

51. The computer program product according to claim 50, wherein the at least one processor is further configured to receive cell range expansion information;
   wherein the at least one processor, based on the received cell range expansion information, determines at least one of the following: additional number of user equipments for handover to the micro cell, a handover parameter, additional bandwidth to be allocated for use by the user equipments communicating with the eNodeB, and a remaining bandwidth of the macro cell.

52. The computer program product according to claim 51, wherein the eNodeB is a macro cell communicating with at least one micro cell.

53. The computer program product according to claim 52, wherein the macro cell receives an indication of utilization of ABS subframes from the micro cell;
   wherein
      an indication that the ABS subframes are fully utilized corresponds to the micro cell being fully utilized and being unable to accept handover of additional user equipment from the macro cell; and
      an indication that the ABS subframes are not fully utilized corresponds to the micro cell being not fully utilized and being able to accept handover of additional user equipment from the macro cell.

54. The computer program product according to claim 53, wherein the macro cell, based on the indication of ABS subframes utilization, determines whether to modify ABS subframe allocation, wherein modification of ABS subframe allocation includes at least one of the following: increasing a number of ABS subframes allocated, decreasing the number of ABS subframes allocated, and unchanging the number of ABS subframes allocated.

* * * * *